March 23, 1937.     M. M. YOUNG     2,074,448
CONTAINER FOR PIEPANS
Filed Feb. 12, 1936

Inventor:
Maude M. Young
by [signature]
Attorney

Patented Mar. 23, 1937

2,074,448

UNITED STATES PATENT OFFICE 2,074,448

CONTAINER FOR PIEPANS

Maude M. Young, Portland, Oreg.

Application February 12, 1936, Serial No. 63,618

6 Claims. (Cl. 53—6)

This invention relates generally to the culinary art, and particularly to a container for pie pans.

The main object of this invention is the provision of an exceedingly simple and efficient form of container in which a standard pie pan may be placed during a baking operation for the purpose of preventing the juices from the pie from overrunning the edges thereof and falling upon the bottom of the oven.

The second object is the production of a container for the purpose mentioned in which ample storage space is provided for any of the juices which may leak past the union between the upper portion of the container and the rim of the pie pan.

The third object is the construction of a bottomless container in which a pie pan can be placed during the baking operation.

The fourth object is to so construct the container that it can be easily applied to the pie pan or the pan removed therefrom and also that it shall be devoid of all working parts, the entire container being made of a single piece which can, if desired, be secured to the pie pan by a snapping action.

These, and other objects, will become more apparent from the specification following as illustrated in the accompanying drawing, in which.

Similar numbers of reference refer to similar parts throughout the several views.

Figure 1:
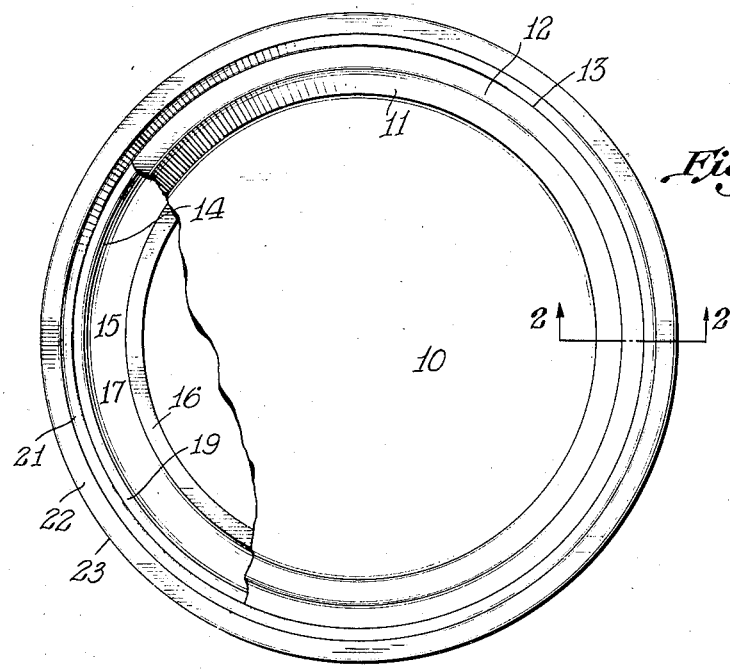
Fig. 1 is a plan of the device showing a pie pan placed therein with a portion thereof broken away in section.
Figure 3:
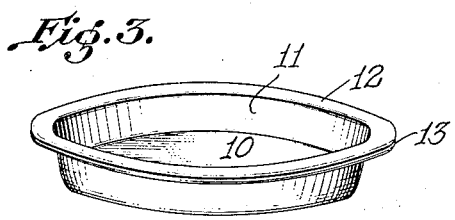
Fig. 3 is a perspective view of a standard pie pan.

Referring in detail to the drawing, there is shown a pie pan from whose bottom 10 extends upwardly the sloping side 11 which terminates in a flat horizontal rim 12, whose outermost edge 13 is preferably inturned.

Referring to the device itself, same consists of a cylindrical body portion 14 which merges at its lowermost end to a rounded edge 15 which rests upon the oven bottom or shelf. The edge 15 terminates in a horizontal inturned portion 16 which is elevated slightly above the edge 15. The edge 15 forms an annular trough 17 in which collects any of the juices 18 which may reach this portion of the device.

The upper end of the cylindrical portion 14 terminates in an out-turned horizontal portion 19 which forms a support for the edge 13 of the pie pan, whose bottom 10 may rest on the inturned portion 16. The portion 19 is provided with a bead 20 into which the pie pan edge 13 can be snapped.

The bead 20 extends upwardly to form the outwardly flared rim 21. The rim 21 terminates at its upper end in the horizontal edge 22 whose outermost portion 23 is inturned on the under side.

Figure 2:
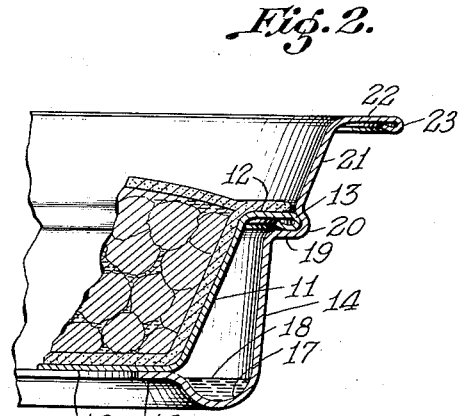
Fig. 2 is a section taken along the line 2—2 in Fig. 1.
Figure 4:
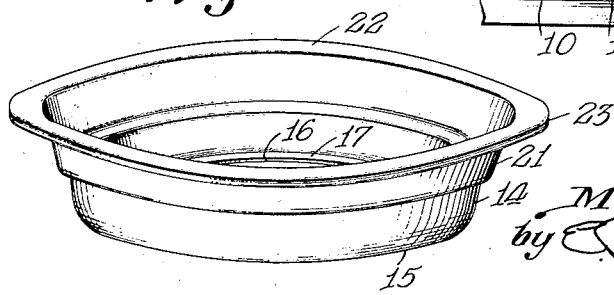
Fig. 4 is a perspective view of the device itself without the pie pan.

The operation of the device is as follows:

The pie pan is placed within the container, as shown in Fig. 2, and the ingredients for the pie are placed within the pan and the container is placed in the oven in the ordinary manner. Owing to the fact that the bottom 10 is not covered or protected by the container, the baking operation will not be retarded or interfered with, there being a sufficient amount of heat conducted upwardly from the bottom 10 and through the side wall 14 to sufficiently heat the side 11 of the pie pan. Should any of the juices of the pie overrun the edge thereof during the baking operation, they will be prevented from running over the edge of the pan into the oven by the rim 21.

If the pie pan edge 13 does not fit the bead 20 perfectly, due to imperfections in manufacture or injuries received by the container or pie pan after manufacturing, and juices do leak past the bead 20, they are caught by the trough 17 and will fill up this trough around its circumference until the overrun is taken care of.

It can be seen from the foregoing that by the construction above described, it is possible to use an ordinary pie pan without any danger of having the juices thereof come into contact with the oven bottom or in any way to interfere with the baking operation itself and without adding anything to the baking operation itself.

Attention is drawn to my earlier Patent No. 2,030,344, over which this is an improvement.

I claim:

1. A bottomless container for pie pans including a means for supporting a pie pan above an oven bottom and means for preventing the juices from the pie from overrunning the sides of the pie pan.

2. A container for pie pans of the class described, consisting of a bottomless holder having a ledge formed around the interior thereof upon which a pie pan can rest, the outer side of said holder extending upwardly to the under side of the pie rim and then outwardly and upwardly to form a wall around the pie pan for the purpose of preventing juices from overrunning the sides of said pan.

3. A container for pie pans of the class described, consisting of a bottomless holder having a ledge formed around the interior thereof upon which a pie pan can rest and means for securing the pie pan upon said ledge.

4. A container for pie pans of the class described, consisting of a bottomless holder having a ledge formed around the interior thereof upon which a pie pan can rest, means for securing the pie pan upon said ledge and means for preventing the escape of pie juices over the upper edge of the container consisting of an outwardly flaring rim extending upwardly from said ledge.

5. A container for pie pans consisting of an annular trough upon the outer side of which a pie pan can rest, the sides of said trough extending upwardly beyond the rim of a pie pan resting upon said trough.

6. The container described in claim 5, including means for securing said pie pan to said container.

MAUDE M. YOUNG.